United States Patent
Klaiber et al.

[11] Patent Number: 5,408,216
[45] Date of Patent: Apr. 18, 1995

[54] BRAKE LIGHT DEVICE FOR MOTOR VEHICLE

[75] Inventors: Rolf Klaiber; Kurt Schuster, both of Reutlinger, Germany

[73] Assignee: Robert Bosch GmbH, Stuttgart, Germany

[21] Appl. No.: 918,265

[22] Filed: Jul. 22, 1992

[30] Foreign Application Priority Data

Aug. 2, 1991 [DE] Germany .................. 9109578 U

[51] Int. Cl.$^6$ .............................................. B60Q 1/44
[52] U.S. Cl. ........................... 340/479; 340/468; 340/472; 362/32; 362/61; 362/80; 116/DIG. 5
[58] Field of Search .............. 340/468, 472, 479; 362/32, 61, 80; 116/DIG. 5

[56] References Cited

U.S. PATENT DOCUMENTS

| | | | |
|---|---|---|---|
| 3,761,706 | 9/1973 | Frey | 362/32 |
| 4,631,642 | 12/1986 | Brun | 362/32 |
| 4,916,592 | 4/1990 | Sultan et al. | 340/479 |
| 5,184,883 | 2/1993 | Finch et al. | 362/61 |
| 5,193,893 | 3/1993 | Mitko | 362/32 |
| 5,217,290 | 6/1993 | Windross | 362/61 |
| 5,222,793 | 6/1993 | Davenport et al. | 362/32 |
| 5,276,594 | 1/1994 | Burkett et al. | 362/32 |

FOREIGN PATENT DOCUMENTS

3538361 11/1986 Germany .

Primary Examiner—John K. Peng
Assistant Examiner—Edward Lefkowitz
Attorney, Agent, or Firm—Michael J. Striker

[57] ABSTRACT

A brake light device for a motor vehicle comprises at least one brake light formed in accordance with prescribed regulations and having a light source, at least one auxiliary brake light and at least one light conductor connecting the auxiliary brake light with the prescribed brake light so that light from the light source of the prescribed light is supplied to the auxiliary brake light.

4 Claims, 2 Drawing Sheets

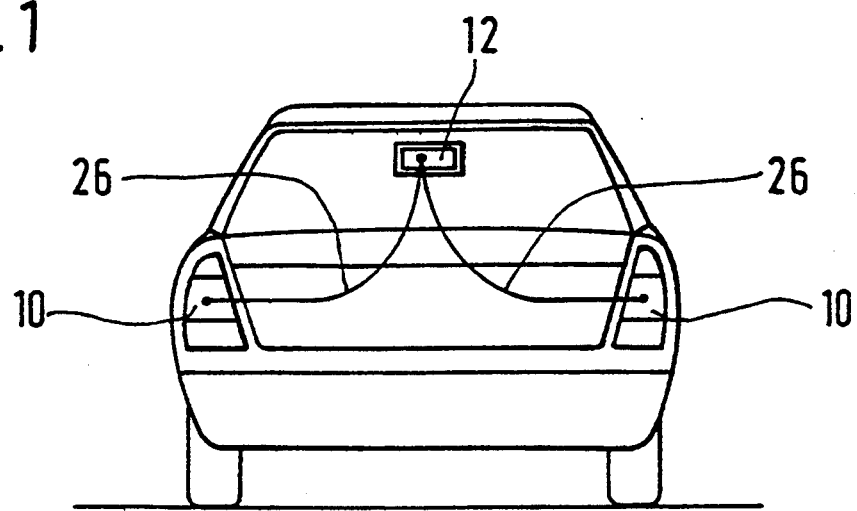
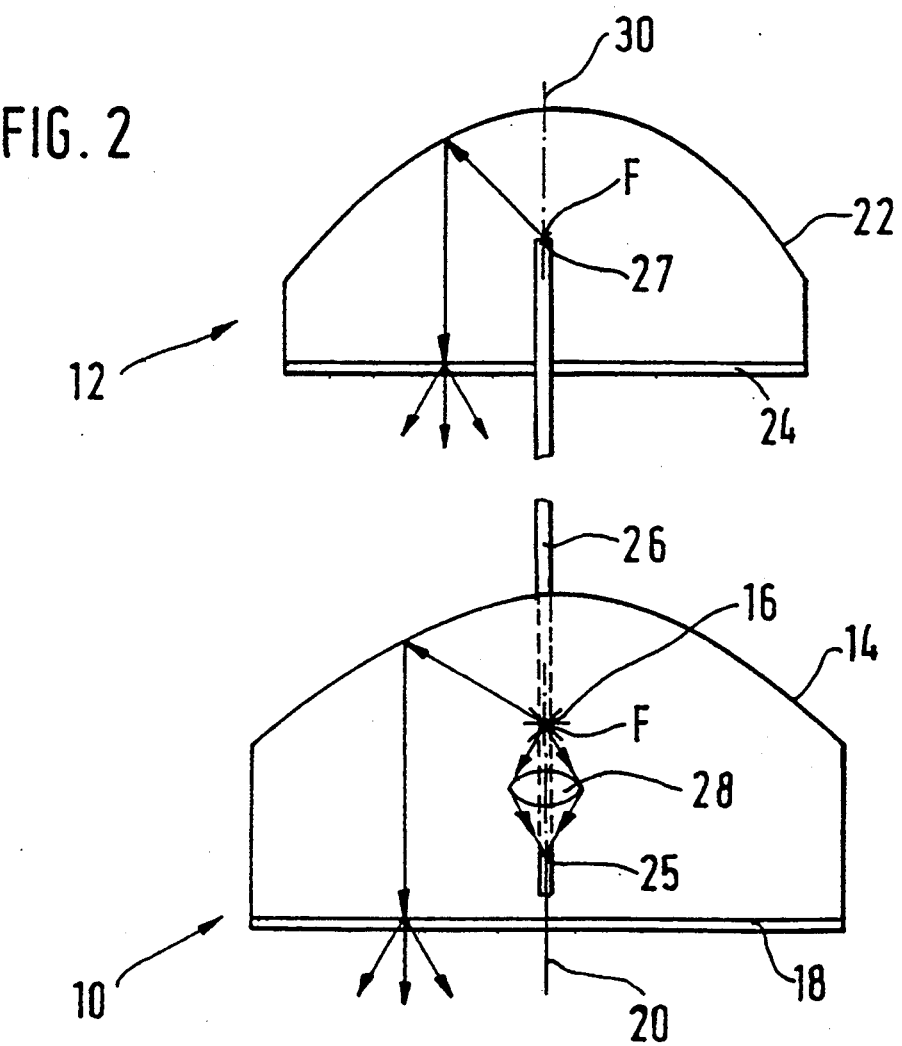

BRAKE LIGHT DEVICE FOR MOTOR VEHICLE

BACKGROUND OF THE INVENTION

The present invention relates to a brake light device for a motor vehicle. More particularly, it relates to a brake light device which has at least one brake light and at least one auxiliary brake light.

Such brake light devices are known in the art. One of such devices is disclosed, for example, in the German reference DE-C1 35 38 361. This brake light device has brake lights prescribed by regulations and arranged at the rear side of a motor vehicle and also an auxiliary light which is located above the prescribed brake light. The auxiliary brake light has its own incandescent lamp which is connected with a brake light switch through the connecting cable similarly to the prescribed brake light. The auxiliary brake light leads to an increased electrical power consumption. Moreover, the incandescent light warms up during the operation relatively intensely so that heat resistant material is required for the auxiliary brake light.

SUMMARY OF THE INVENTION

Accordingly, it is an object of the present invention to provide a brake light device which avoids the disadvantages of the prior art.

More particularly, it is an object of the present invention to provide a brake light device in which no connection with the brake light switch is necessary, no additional electrical energy is necessary, and cost favorable materials can be used for the auxiliary brake light since only a very low heat generation in it occurs.

In keeping with these objects and with others which will become apparent hereinafter, one feature of the present invention resides, briefly stated, in a brake light device of the above general type in which an auxiliary brake light is connected with at least one prescribed brake light by a light conductor so that light sent from a light source of the prescribed brake light is supplied to the auxiliary brake light.

When the brake light device is designed in accordance with the present invention, it eliminates the disadvantages of the prior art and achieves the above mentioned highly advantageous results.

In accordance with another feature of the present invention the prescribed brake light has at least one collecting lens through which light sent from the light source is concentrated on the light conductor and arranged in the prescribed brake light.

In accordance with another feature of the present invention the prescribe brake light has the reflector and at least one collecting lens, and through the collecting lens the light which is reflected from the reflector is concentrated on the light conductor and arranged in the prescribed brake light.

When the brake light device is designed in accordance with these features, a higher efficiency of the light transmission of the prescribed brake light to the auxiliary brake light is obtained.

In accordance with another feature of the present invention, the light from the collecting lens is reflected from an edge region of the reflector and contributes only little for producing the prescribed brake light. In this way the prescribed brake light is influenced as little as possible.

Finally, in accordance with another feature of the present invention, the auxiliary brake light is connected with two prescribed brake lights through one light conductor each, respectively. In this way a high light intensity of the auxiliary brake light is obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a rear view of a motor vehicle with a brake light device of the present invention;

FIG. 2 is a view showing the first embodiment of a brake light device in accordance with the present invention.

DESCRIPTION OF THE PREFERRED EMBODIMENTS

Figure 3:
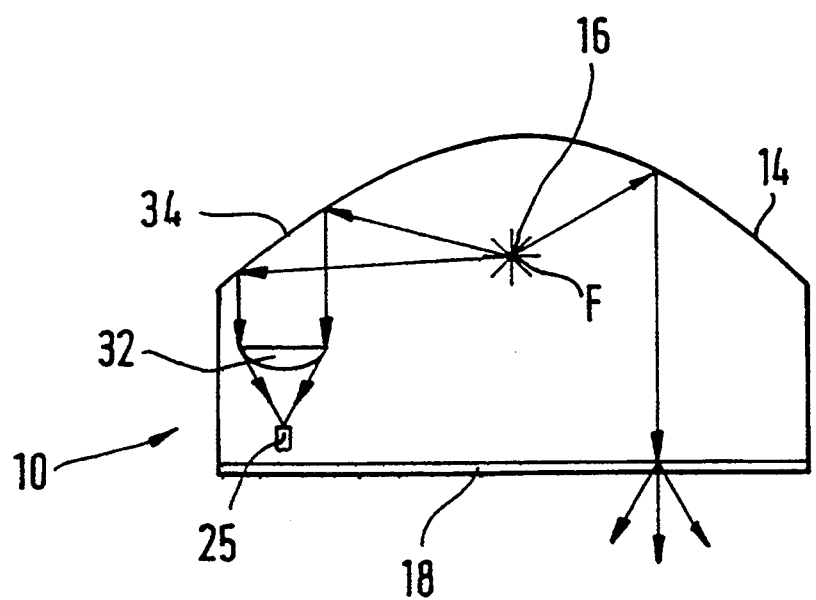
FIG. 3 is the second embodiment of the brake light device in accordance with the present invention.

In FIG. 1 which shows a rear view of a motor vehicle, two main brake lights 10 produce light prescribed in accordance with the regulation and are arranged for example at the end of the chassis of the motor vehicle. Moreover, a further auxiliary brake light 2 is provided and arranged higher than the prescribed brake light 10 for example in the region of the rear window of the motor vehicle.

In FIG. 2 only one of the brake lights 10 is shown. The brake light 10 has a reflector 14 and an incandescent lamp 16 as a light source. The incandescent lamp 16 is arranged substantially in the focal point F of the reflector. The light outlet opening of the reflector 14 is closed with a light disc 18. The reflector 14 can have, for example, a parabolic shape so that the light emitted from the incandescent lamp 16 is reflected parallel to the optical axis 20 of the reflector. The light disc 18 has optically effective elements, by which the light reflected from the reflector 14 is deviated and/or dispersed so that the prescribed regulations with respect to the light distribution of the brake lights 10 are maintained.

The auxiliary brake light 12 also has a reflector 22 which has for example a parabolic shape and a light disc 24. However, it does not have its own light source. The auxiliary brake light 12 is connected with the above described brake lights 10 through a light conductor 26. An end 25 of the light conductor 26 extends into the brake light 10, while its another end 27 extends into the auxiliary brake light 26. The brake light 10 has a collective (converging) lens 28 which in the first embodiment shown in FIG. 2 is arranged so that it is spaced from the incandescent lamp 16 in a light direction. The light emitted directly forwardly from the incandescent lamp is focused by the collective lens 28 onto the end 25 of the light conductor 26. Instead of a single collective lens, a system of several collective lenses can be provided as well. Due to the collective lens 28 as well as the light conductor 26 the prescribed braking light is influenced only a little.

The end 27 of the light conductor 26 which extends in the auxiliary brake light 12 is arranged substantially in a focal point F of the reflector 22. Therefore, the light exiting the light conductor 26 is reflected parallel to its optical axis 30 and then is dispersed and/or deviated by the light disc 24 which has the optically active elements, in a manner required for obtaining a predetermined light distribution. The light conductor 26 can be formed for example as a glass fiber cable composed of several individual glass fibers. The reflector 22 and the light disc 24 of the auxiliary brake light are composed of a synthetic plastic material. The light exiting the light conductor 26 warms up the auxiliary brake light 12 only little, so that cost favorable synthetic plastic material with low thermal resistance can be used. The auxiliary brake light 12 does not lead to an increased electrical power consumption since it is supplied by the available incandescent lamp 16.

The auxiliary brake light 12, instead of the reflector 22, can be provided with one or several lenses. With the lenses the light exiting the light conductor 26 can be received and directed onto the light disc 24. With a corresponding design of these lenses, the light disc 24 can be formed without optically effective element, but instead can be formed as a disc which is colored in the required signal colors. The auxiliary brake light 12 can be connected through a respective light conductor 26 with both brake lights 10 so that a greater light intensity becomes available. The light conductors 26 extending from both brake lights 10 can be united before the entry into the auxiliary brake light 12 to form a single light conductor.

In the third embodiment shown in FIG. 3 the light reflected by the reflector 14 of the brake light 10 is focused by a collective lens 32 on the end side 25 of the light conductor 26. Here in an advantageous manner the light reflected from an edge region 34 of the reflector 14 is used. For producing of the prescribed brake light it contributes only little.

It will be understood that each of the elements described above, or two or more together, may also find a useful application in other types of constructions differing from the types described above.

While the invention has been illustrated and described as embodied in a brake light device for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A brake light device for a motor vehicle, comprising at least one main brake light producing light with a light distribution required for brake lights and having a light source; at least one auxiliary brake light; and at least one light conductor connecting said auxiliary brake light with said main brake light so that light from said light source of said main brake light is supplied to said auxiliary brake light, said main brake light having a reflector and at least one collective lens arranged so that light reflected from an edge region of said reflector is concentrated by said collective lens on an end of said light conductor arranged in said main brake light, for supplying said auxiliary brake lights with the light reflected from said edge region of said reflector of said main brake light, such that only a small portion of light from said light source of said main brake light is supplied to said auxiliary brake light, while the remaining light from said light source is used for producing the light of said main brake light with said light distribution required for brake lights.

2. A brake light device as defined in claim 1; and further comprising an additional brake light formed and an additional light conductor, said auxiliary brake light being connected with said brake lights through said light conductors.

3. A brake light device as defined in claim 1, wherein said auxiliary brake light is composed of synthetic plastic material.

4. A brake light device for a motor vehicle, comprising two main brake lights producing light with a light distribution required for brake lights and each having a light source; at least one auxiliary brake light; and two light conductors each connecting said auxiliary brake light with a respective one of said main brake lights so that light from said light sources of said main brake lights is supplied through said light conductors to said auxiliary brake light, each of said main brake lights having a reflector and at least one collective lens arranged so that light reflected from an edge region of said reflector of each of said main brake lights is concentrated by said collective lens on an end of a respective one of said light conductors arranged in a respective one of said brake lights, for supplying said auxiliary bake lights with the light reflected from said edge region of said reflector of said main brake light, such that only a small portion of light from said light sources of said main brake lights are supplied to said auxiliary brake light, while the remaining light from said light sources are used for producing the light of said main brake lights with said light distribution required for brake lights.

* * * * *